United States Patent
Grasso et al.

[11] Patent Number: 6,159,628
[45] Date of Patent: *Dec. 12, 2000

[54] USE OF THERMOPLASTIC FILMS TO CREATE SEALS AND BOND PEM CELL COMPONENTS

[75] Inventors: Albert P. Grasso, Vernon; Myron Krasij, Avon; Michael J. Rajpolt, Marlborough, all of Conn.

[73] Assignee: International Fuel Cells LLC, So. Windsor, Conn.

[ * ] Notice: This patent is subject to a terminal disclaimer.

[21] Appl. No.: 09/220,472

[22] Filed: Dec. 23, 1998

Related U.S. Application Data

[63] Continuation of application No. 09/176,355, Oct. 21, 1998, and a continuation of application No. 09/182,959, Oct. 30, 1998, Pat. No. 6,020,083.

[51] Int. Cl.$^7$ ................................................ H01M 2/08
[52] U.S. Cl. ...................... 429/35; 429/36; 429/38; 429/39; 429/30; 429/33; 429/41; 429/44
[58] Field of Search ................... 429/35, 36, 38, 429/39, 30, 33, 41, 44

[56] References Cited

U.S. PATENT DOCUMENTS

| | | | |
|---|---|---|---|
| 3,867,206 | 2/1975 | Trocciola et al. | 136/86 D |
| 4,279,970 | 7/1981 | Breault et al. | 429/35 |
| 4,729,932 | 3/1988 | McElroy | 429/34 |
| 4,756,981 | 7/1988 | Breault et al. | 429/36 |
| 4,769,297 | 9/1988 | Reiser et al. | 429/17 |
| 4,913,706 | 4/1990 | Luoma et al. | 29/623 |
| 5,176,966 | 1/1993 | Epp et al. | 429/26 |
| 5,176,996 | 1/1993 | Hogan et al. | 435/6 |
| 5,264,299 | 11/1993 | Krasij et al. | 429/30 |
| 5,300,124 | 4/1994 | Breault et al. | 29/623.3 |
| 5,360,679 | 11/1994 | Buswell et al. | 429/19 |
| 5,366,825 | 11/1994 | Breault et al. | 429/34 |
| 5,464,700 | 11/1995 | Steck et al. | 429/30 |
| 5,503,944 | 4/1996 | Meyer et al. | 429/13 |
| 5,523,175 | 6/1996 | Beal et al. | 429/30 |
| 5,700,595 | 12/1997 | Reiser | 429/13 |
| 6,020,083 | 2/2000 | Breault et al. | 429/36 |

FOREIGN PATENT DOCUMENTS 389020  10/1989  Austria.

*Primary Examiner*—Bruce F. Bell
*Attorney, Agent, or Firm*—Barlow, Josephs & Holmes, Ltd.

[57] ABSTRACT

An improved membrane electrode assembly for PEM fuel cells is provided. Catalyst layers (40, 44) are disposed, respectively, on both sides of the proton exchange membrane (48). Gas diffusion layers (38, 50) are disposed, respectively, on sides of the catalyst layers (40, 44) not in contact with the proton exchange membrane (48). Porous substrates (32, 34) are disposed, respectively, on sides of the gas diffusion layers (38, 50) not in contact with the catalyst layers (40, 44). The porous substrates (32, 34) are impregnated at their periphery with a thermoplastic material. Thermoplastic film layers (42, 46, 68) are employed at the periphery of the assembly (10) between component parts to bond and seal water transport plates (12' and 16) to each other, as well as substrates (32, 32', 34) to the membrane electrode assembly (20). A foam tape 60, 62, 62' are employed to seal water transport plates (12, 12', 16) to respective substrates (32, 32', 34).

18 Claims, 3 Drawing Sheets

USE OF THERMOPLASTIC FILMS TO CREATE SEALS AND BOND PEM CELL COMPONENTS

This is a continuation to commonly owned applications Ser. No. 09/176,355, filed Oct. 21, 1998 and Ser. No. 09/182,959, filed Oct. 30, 1998 now U.S. Pat. No. 6,020,083.

The U.S. Government has a paid-up license in this invention and the right in limited circumstances to require the patent owner to license others on reasonable terms as provided for by the terms of Contract No. DAAB07-97-C-6006.

TECHNICAL FIELD

The present invention relates to proton exchange membrane fuel cells and membrane electrode assemblies for fuel cells. More specifically, the present invention relates to improved construction of fuel cells to simplify and reduce the cost of production of such cells. In addition, the present invention relates to methods for bonding fuel cell components to one another as well as sealing of the fuel cell stack.

BACKGROUND ART

Solid polymer electrolyte fuel cell power plants are known in the prior art, and prototypes are even available from commercial sources. These systems are serviceable, but are relatively complex. An example of a polymer membrane power plant is shown in U.S. Pat. No. 5,360,679, granted Nov. 1, 1994.

In addition, known fuel cell constructions commonly include a proton exchange membrane disposed between respective cathode and anode plates. The general principles of construction and operation of such fuel cells are so well known that they need not be discussed here in great detail. In general, the operation of a proton exchange membrane (PEM) fuel cell includes the supply of gaseous fuel and an oxidizing gas to the anode electrode plate and cathode electrode plate, respectively, and distributed as uniformly as possible over the active surfaces of the respective electrode plates, or, more specifically, the electrode plate surfaces facing the proton exchange membrane, each of which typically includes a catalyst layer therebetween. An electrochemical reaction takes place at and between the anode plate and cathode plate, with attendant formation of a product of the reaction between the fuel and oxygen, release of thermal energy, creation of an electrical potential difference between the electrode plates, and travel of electric charge carriers between the electrode plates, with the thus generated electric power usually constituting the useful output of the fuel cell.

One problem occurring in solid polymer fuel cells relates to the management of water, both coolant and product water, within the cells in the power plant. In a solid polymer membrane fuel cell power plant, product water is formed by an electrochemical reaction on the cathode side of the cells, specifically by the combination of hydrogen ions, electrons and oxygen molecules. The product water must be drawn away from the cathode side of the cells, and makeup water must be provided to the anode side of the cells in amounts which will prevent dryout of the proton exchange membrane, while avoiding flooding, of the cathode side of the electrode plate.

Austrian Patent No. 389,020 describes a hydrogen ion-exchange membrane fuel cell stack which utilizes a fine pore water coolant plate assemblage to provide a passive coolant and water management control. The Austrian system utilizes a water-saturated fine pore plate assemblage between the cathode side of one cell and the anode side of the adjacent cell to both cool the cells and to prevent reactant crossover between adjacent cells. The fine pore plate assemblage is also used to move product water away from the cathode side of the ion-exchange membrane and into the coolant water stream; and to move coolant water toward the anode side of the ion-exchange membrane to prevent anode dryout. The preferred directional movement of the product and coolant water is accomplished by forming the water coolant plate assemblage in two parts, one part having a pore size which will ensure that product water formed on the cathode side will be wicked into the fine pore plate and moved by capillarity toward the water coolant passage network which is inside of the coolant plate assemblage. The coolant plate assemblage also includes a second plate which has a finer pore structure than the first plate, and which is operable to wick water out of the water coolant passages and move that water toward the anode by capillarity. The fine pore and finer pore plates in each assemblage are grooved to form the coolant passage network and reactant passage network, and are disposed in face-to-face alignment between adjacent cells. The finer pore plate is thinner than the fine pore plate so as to position the water coolant passages in closer proximity with the anodes than with the cathodes. The aforesaid solution to water management and cell cooling in ion-exchange membrane fuel cell power plants is difficult to achieve due to the quality control requirements of the fine and finer pore plates, and is also expensive because the plate components are not uniformly produced.

In the fuel cell technology, the water transport plate is a porous structure filled with water. During fuel cell operation, the water transport plate supplies water locally to maintain humidification of a proton exchange membrane (PEM), removes product water formed at the cathode, removes by-product heat via a circulating coolant water stream, conducts electricity from cell to cell, provides a gas separator between adjacent cells and provides passages for conducting the reactants through the cell. The water transport plate supplies water to the fuel cell to replenish water which has been lost by evaporation therefrom. This system and operation thereof is described in U.S. Pat. No. 5,303,944 by Meyer, U.S. Pat. No. 5,700,595 by Reiser and U.S. Pat. No. 4,769,297 by Reiser, each incorporated herein by reference.

For a fuel cell to be economically feasible, it must not only have a superior design and have the desired performance but it must also be capable of being mass produced. The mass production of fuel cell components raises several issues which are of great concern. The cost of production must be kept as low as possible without sacrificing quality and efficiency of the cell. As fuel cell components become more complex and more components are needed in a given fuel cell, the cost of that cell increases significantly.

Fuel cell components, such as gas diffusion layers, catalyst layers, substrates, and water transport plates are becoming increasing complex requiring precision dimensioning. In particular, prior art fuel cell components commonly employ edge gaskets which, in combination with the components above, require close tolerances in the manufacturing process to avoid the component being scrapped and to provide an effective seal. The requirement of maintaining close tolerances are necessitated due to the inherent step discontinuities associated with the employment of edge gaskets within known fuel cell assemblies.

Further, a major concern with PEM fuel cells is reactant distribution and containment within the cell. This is of particular concern when employing porous members such as electrode substrates. This porosity is needed to supply to and substantially uniformly distribute over the respective active surface the respective gaseous medium which is fed through respective channels provided in the anode water transport plate and the cathode water transport plate to the areas of the respective electrode plate that are catalytically active and spaced from the proton exchange membrane. Also, these porous structures are used to remove the reaction water from one of the active surfaces and supply of water to the other active surfaces to avoid drying out of the proton exchange membrane.

When porous water transport plates and porous electrode substrates are employed in a PEM fuel cell, it is necessary to ensure that neither any liquid, such as product or coolant water in a PEM fuel cell, nor any gaseous media such as the fuel or oxidant, be able to flow in or out of the periphery or edge of the respective porous water transport plate or electrode substrate. The escape of reactant gases through the periphery or edge of the water transport plates or electrode substrates results in the loss of the respective media causing a decrease in fuel cell efficiency. Most importantly, preventing the escape of media through the periphery or edge of the water transport plate or electrode substrate is critical to avoid the mixture of gaseous fuel with the oxidizing gas or ambient air which could be catastrophic. Therefore, manufacturing tolerances must be kept to a minimum and step discontinuities must be eliminated to ensure effective sealing to realize proper fuel cell operation. Also, to avoid component corrosion, oxygen must be prevented from reaching the cathode catalyst in its corresponding seal area and the associated high potentials on the cathode side of the fuel cell.

Various attempts have been made in the prior art to provide a seal design for a PEM fuel cell to minimize the effect of poor manufacturing tolerances and step discontinuities. One such attempt is described in U.S. Pat. No. 5,176,966 by Epp et al., incorporated herein by reference. For example, this patent discloses a solid polymer ion exchange membrane disposed between two carbon fiber paper support layers. Interdisposed between the support layers and the exchange membrane are catalyst layers. The support layers support substantially the entire surface of the exchange membrane. However, this construction is susceptible to corrosion due to the poor peripheral sealing to prevent oxygen from reaching the cathode catalyst. For example, U.S. Pat. No. 5,264,299, incorporated herein by reference, also teaches such a construction.

In addition to the foregoing considerations relating to sealing within a PEM fuel cell, the bonding of fuel cell components and materials used therefor are of critical concern. The bonding of fuel cell components, particularly graphite water transport plate cell components, together into sub-assemblies is highly desirable and well known in the industry. Current water transport plates are commonly bonded together with a fluoroelastomer, such as FLOUROLAST, which cure to form a small but measurable buildup on the applied surface. This buildup is tolerable for large active area fuel cells which can deflect sufficiently to maintain electrical contact in the active area. However, fuel cells with small active areas suffer from a higher than desirable voltage drop because they are less tolerant to the fluoroelastomer buildup. Efforts to solve this problem are addressed in commonly owned applications Ser. No. 09/176,355, filed Oct. 21, 1998 and Ser. No. 09/182,959, filed Oct. 30, 1998.

Also, current graphite sub-assemblies are typically machined to include a step to accommodate a silicone-coated fiberglass gasket. The edges of adjacent substrates are vacuum-impregnated with a two-part, liquid, silicone rubber which is subsequently cured to form an edge seal. This common construction method suffers from the disadvantages of being tedious, time consuming and expensive. These seals are relatively stiff and require high seating loads. As a result, this know method of construction provides unacceptable sealing performance.

In view of the foregoing, an improved fuel cell is desired which is inexpensive and capable of mass production. Also, a fuel cell construction method is desired which will produce a lower cost assembly with improved performance while simplifying the stacking process during stack assembly. To avoid high seating loads, it is also desirable to eliminate stiff silicone-coated fiberglass gaskets in the fuel cell construction. It is also preferred that the sealing and bonding process be simplified without sacrificing efficient operation of the cell.

DISCLOSURE OF THE INVENTION

The present invention preserves the advantages of prior art fuel cell assemblies. In addition, it provides new advantages not found in currently available fuel cell assemblies, and overcomes many disadvantages of such currently available fuel cell assemblies.

This invention is generally directed to a novel fuel cell with an improved component bonding and sealing construction. The preferred embodiment of the improved PEM fuel cell assembly construction consists of a proton exchange membrane having a central area and peripheral area on first and second sides thereof. A cathode catalyst layer is disposed on the first side of the proton exchange membrane in a region over the central area. An anode catalyst layer is disposed on the second side of the proton exchange membrane in a region over the central area.

An anode gas diffusion layer is disposed on a side of the anode catalyst layer not in contact with the proton exchange membrane. An anode porous substrate is disposed on a side of the anode gas diffusion layers not in contact with the anode catalyst layer.

An anode water transport plate is disposed on a side of the anode porous substrate not in contact with the anode gas diffusion layer. The anode water transport plate has a central area and a peripheral area. A cathode water transport plate is disposed on a side of the anode water transport plate not in contact with the anode substrate. The cathode water transport plate includes a central area and a peripheral area.

A bonding and sealing layer of thermoplastic film is disposed between the anode water transport plate and the cathode water transport plate at respective peripheral areas thereof. The layer of thermoplastic film bonds and seals the anode water transport plate and the cathode water transport plate relative to one another.

A cathode substrate is disposed on a side of the cathode water transport plate which is not in contact with the anode water transport plate. A cathode gas diffusion layer is disposed on a side of the cathode substrate which is not in contact with the cathode water transport plate.

In addition to the preferred embodiment disclosed above, the present invention generally provides for the employment of thermoplastic material for sealing and bonding of various components of a fuel cell. Fuel cells of different configurations may employ the thermoplastic material layer of the present invention. For example, a fuel cell with or without gas diffusion layers on the substrates and substrates which are fully or partially wetproofed can employ the present invention. As will be discussed in detail below, various seal combinations can be carried out in accordance with the present invention.

It is therefore an object of the present invention to provide a PEM fuel cell assembly which has good sealing characteristics and is inexpensive to manufacture.

It is also an object of the present invention to provide a PEM fuel cell assembly which simplifies the bonding and sealing manufacturing steps.

It is further an object of the present invention to provide a PEM fuel cell assembly which has more effective and reliable seals with less leaking.

It is further an object of the present invention to provide a PEM fuel cell assembly which employs inert materials that are less likely to introduce contaminants to the proton exchange membrane.

It is also an object of the present invention to provide a PEM fuel cell assembly which includes a membrane electrode assembly which realizes low scrap rates in production.

It is another object of the present invention to provide a PEM fuel cell which bonds and seals components with thermoplastic material rather than elastomers.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

MODES FOR CARRYING OUT THE INVENTION

Figure 1:
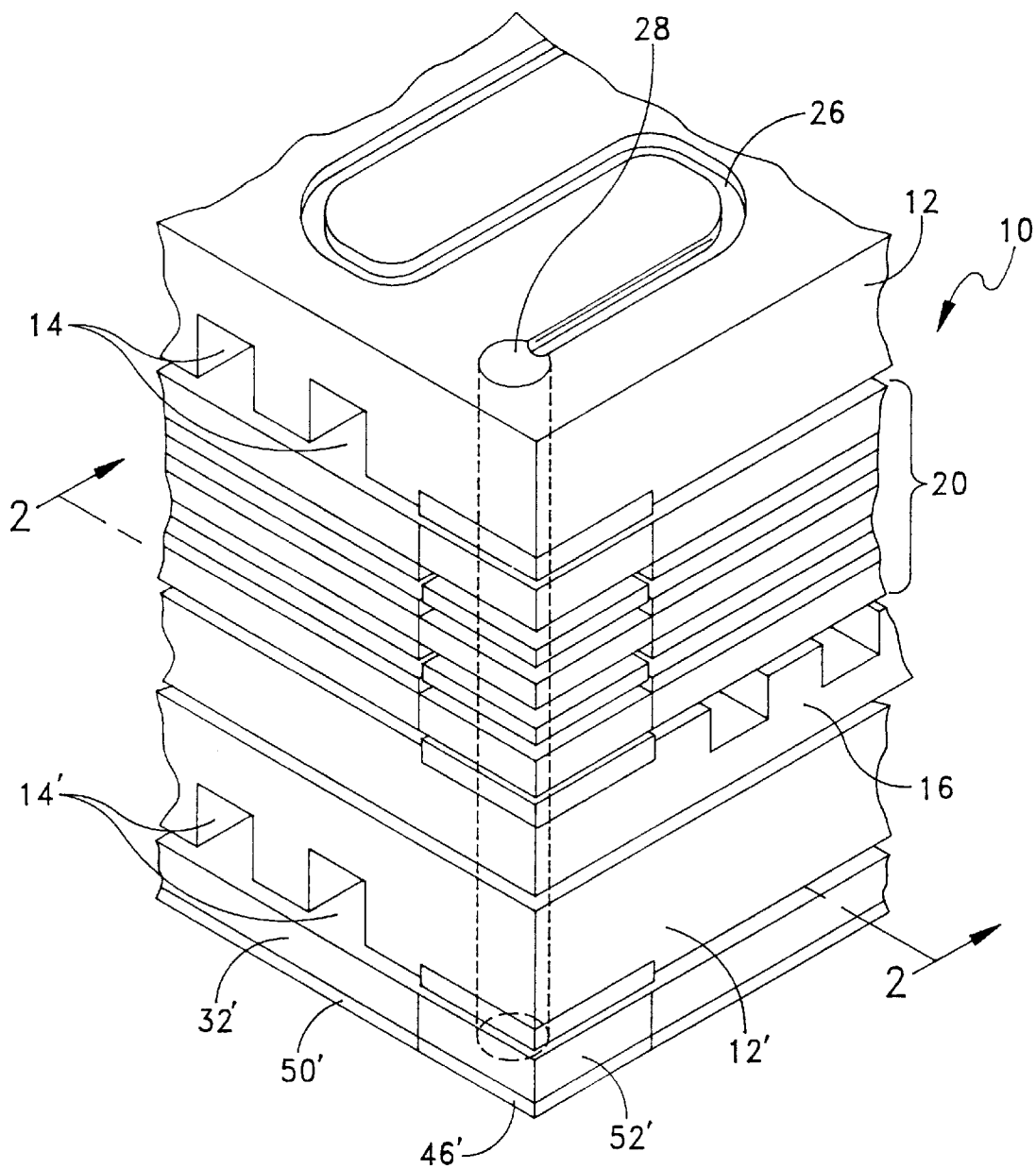
FIG. 1 is a perspective view of the PEM fuel cell employing the thermoplastic sealing and bonding layers of the present invention.
Figure 2:
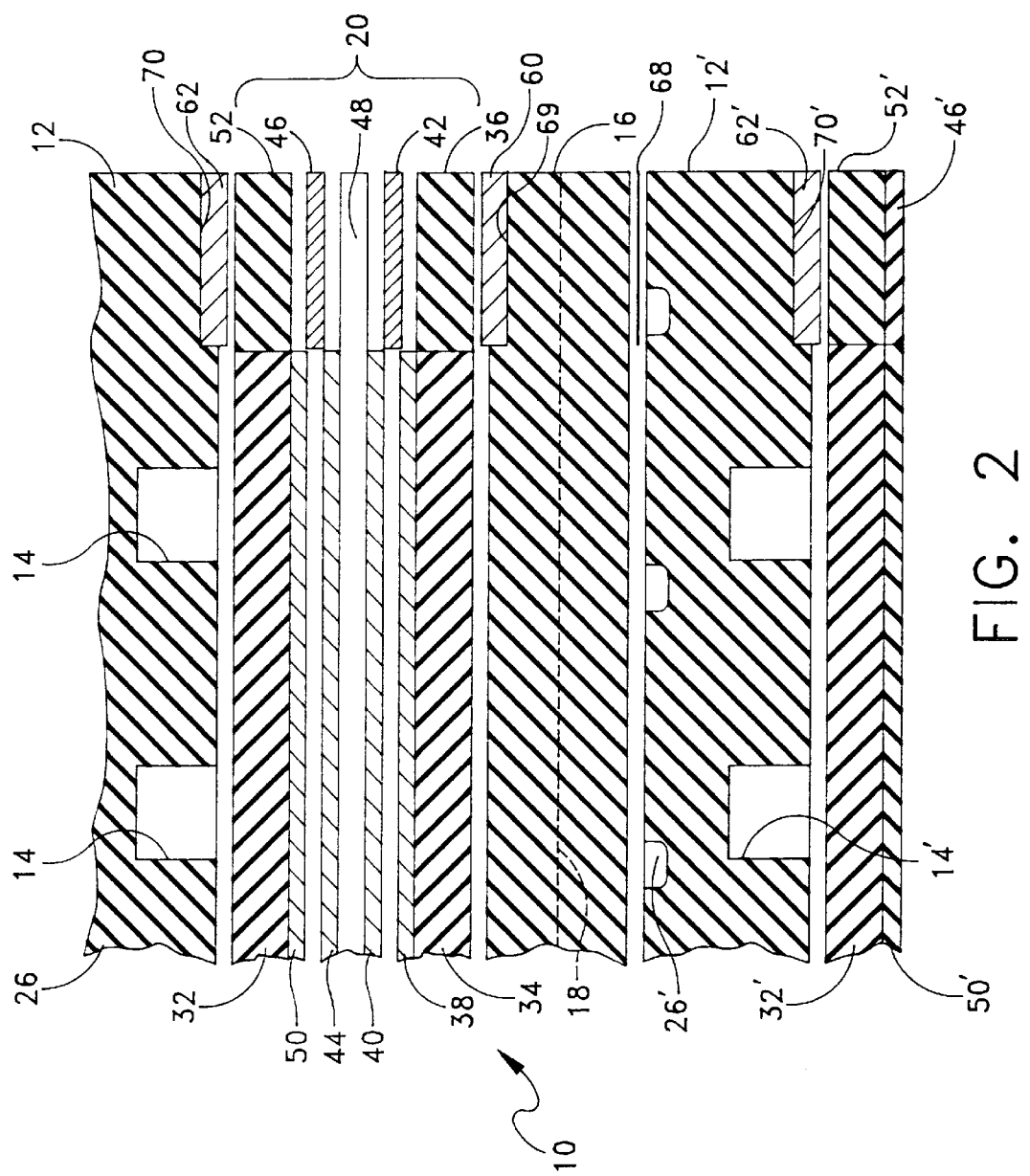
FIG. 2 is a cross-sectional view through the line 2—2 of FIG. 1.

Referring to both FIGS. 1 and 2, a proton exchange membrane (PEM) fuel cell assembly 10 is shown. It should be understood that this cell 10 is shown in its present configuration to facilitate illustration of the present invention. A number of cell assemblies 10 are ideally stacked together, such as in a multi-cell stack, to form a completed fuel cell stack assembly.

The assembly 10 includes a cathode water transport plate 12 and anode water transport plate 16 which may be made in accordance with various methods of manufacturing known in the art. The cathode water transport plate 12 includes cathode air flow channels 14 while anode water transport plate 16 includes anode fuel flow channels 18. Cathode water transport plate 12 includes coolant flow channel 26. Water transport plates 12 and 16 are preferably formed of graphite powder, cellulosic fibers, and reinforcing fibers all bonded together with a thermosetting resin and heat treated to convert the organic materials to carbon.

Disposed between cathode water transport plate 12 and anode water transport plate 16 is a membrane electrode assembly (MEA), generally referenced as 20. Within the membrane electrode assembly 20, a cathode substrate 32 with a cathode gas diffusion layer 50 thereon and impregnated substrate edge seal 52 is provided. Seal 52 is preferably formed by extruding a thermoplastic polymer, such as polyvinylidine fluoride sold under the name KYNAR, available from Westlake Plastics, into the periphery of the substrate. Cathode gas diffusion layer 50 is substantially co-extensive with a central portion of cathode substrate 32 which does not include seal 52.

Also provided is anode substrate 34 with an anode gas diffusion layer 38 thereon and thermoplastic impregnated substrate seal 36 which may be formed in similar fashion to thermoplastic seal 52 and may employ similar materials. Anode gas diffusion layer 38 is substantially co-extensive with a central portion of anode substrate 34 which is not embedded with seal 36. Alternatively, the gas diffusion layers 38 and 50 may be, respectively, eliminated on either or both substrates 32 and 34.

Anode catalyst 40 and cathode catalyst 44 are provided with proton exchange membrane 48 sandwiched therebetween. Catalyst layers 40 and 44 are preferably co-extensive with a central portion of proton exchange membrane 48. Catalyst layers 40 and 44 may be platinum or other suitable catalyst material. Preferably, catalyst layers 40 and 44 are to be smaller in planform than membrane 48.

Between various components of the fuel cell assembly 10 of the present invention, thermoplastic material is provided to effectively bond and seal components of assembly 10 relative to one another and simplify the stacking process. In particular, thermoplastic material 46, preferably polyolefin sold under the name THERMOBOND film, available from 3M Corporation, is provided between cathode substrate seal 52 and proton exchange membrane 48. Other suitable thermoplastic materials, such as polyvinyl fluoride sold under the name TEDLAR, available from dupont, may be employed. In general, any thermoplastic material which is heat and corrosion resistant and has a melting point between 200–450° F. and which is compatible with the environment of a PEM fuel cell is suitable to serve as the thermoplastic material. This thermoplastic material may be obtained as a film and cut to the desired size and configuration. In addition, a foam tape 62 is provided between cathode substrate 32 and a shallow land 70 in the cathode water transport plate 12 at their respective peripheral regions, particularly at seal 52. Foam tape 60 is also provided between anode substrate 34 and a shallow land 69 in the anode water transport plate 16 at their respective peripheral regions, particularly at seal 36. A suitable foam tape is grade 4962 neoprene tape manufactured by 3M which contains a two-sided adhesive. The preferred thickness of the foam tape is 0.010–0.030 inches. Any rubber foam that is compatible with the fuel cell environment may be used.

Anode substrate surface seal 42 is provided on anode substrate 38 which is also preferably of thermoplastic material. Cathode substrate surface seal 46 is provided on cathode substrate 32 and is also preferably of thermoplastic material. Further and of critical importance, thermoplastic layer 68 is provided between anode water transport plate 16 and cathode water transport plate 12' of the next repeating cell stack. This enables effective and reliable bonding and sealing between water transport plates and, as stated above.

As can be understood, repeated components in the cell stack also employ the same configuration and sealing as described above. For example, second cathode water transport plate 12' is bonded and sealed to cathode substrate 32' at their peripheries by foam tape 62'. Cathode diffusion layer 50' is disposed on cathode substrate 32'. Thermoplastic edge seal 52' is formed in cathode substrate 32' with thermoplastic seal 46' also provided.

Figure 3:
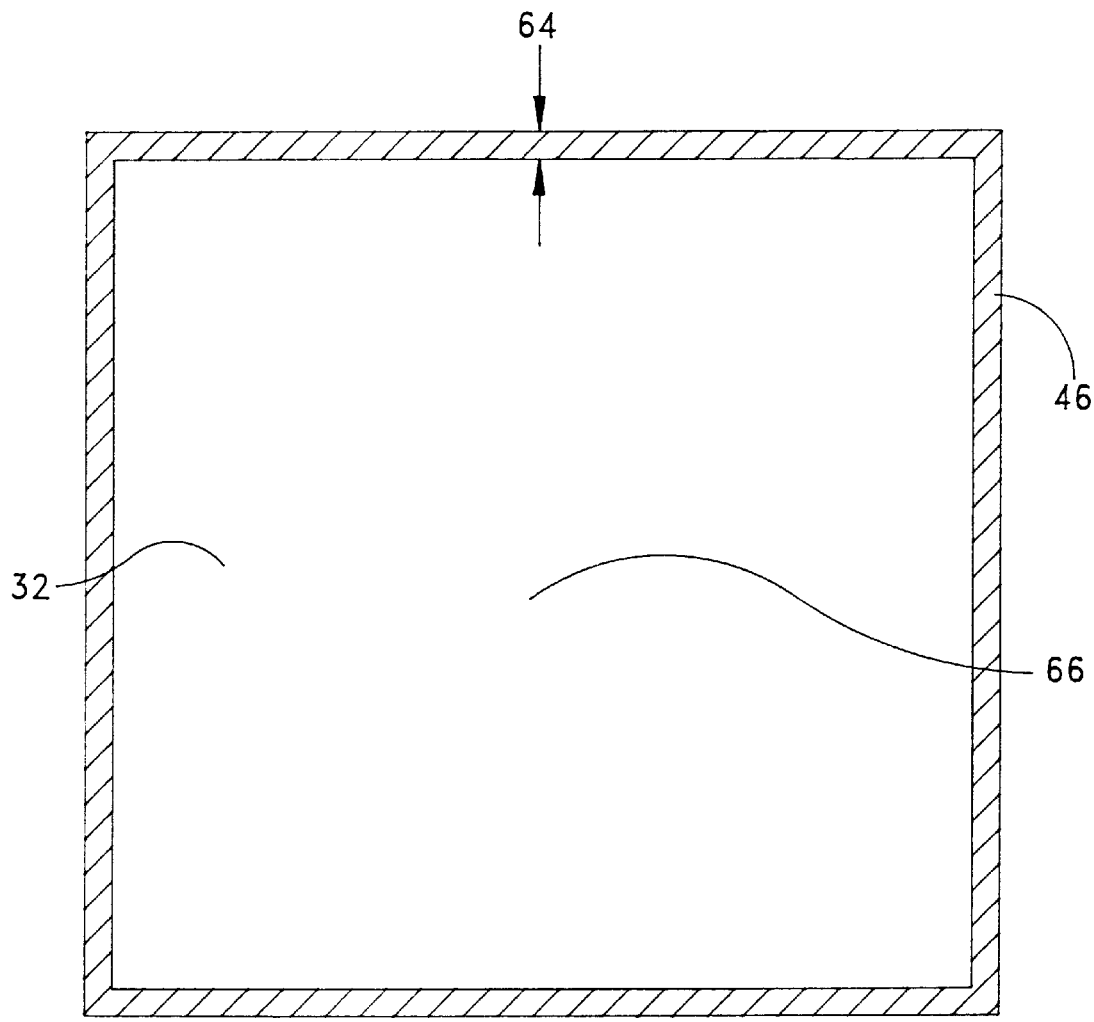
FIG. 3 is plan view of a cathode substrate of the present invention with peripheral application of thermoplastic material thereon.

FIG. 3 illustrates a plan view of the cathode substrate 32 with suitable substrate surface seal 46 having a width 64 disposed about the entire peripheral edge portion of cathode substrate 32. Anode substrate 34 also has a suitable substrate surface seal 42 disposed about the entire peripheral edge portion of anode substrate 34 of the general plan layout shown in FIG. 3.

In the manufacturing process, cathode substrates 32, 32' and anode substrate 34 are porous carbon paper, such as grade TGP-006, obtained from Toray Marketing & Sales, Inc., Encino, Calif. These substrates are selectively wet-proofed with a fluoropolymer such as grade FEP-120 Teflon obtained from the E. I. DuPont Co. of Wilmington, Del. to a fluoropolymer concentration of 10 to 20 weight percent. The cathode substrate 32 and anode substrate 34 are selectively wetproofed such that the central area 66 is wetproofed and the peripheral seal area 46 is not wetproofed. Alternatively, the total area of the substrate may be wetproofed. The wetproofing can be applied by methods well known in the art such as screen printing. Gas diffusion layers 50 and 38 are, respectively, applied to substrates 32 and 34. The so-called gas diffusion gas diffusion layers are typically formed from a high structure carbon black, such as Vulcan XC-72 made by the Cabot Co. of Billrecia, Mass., and 35–65 weight percent fluoropolymer such as the FEP-120 previously referenced or grade TFE-30 or equivalent. The gas diffusion layer is applied by methods well known in the art such as commonly owned U.S. Pat. No. 4,233,181. The gas diffusion layers are typically 0.002 inches to 0.005 inches thick.

Manufacture of the fuel cell component assembly 10 of the present invention, namely the employment of thermoplastic layers, will be further clarified with reference to the following illustrative example. Component tests were performed to establish the bonding and sealing characteristics of the improved cell. It is not, however, meant to limit the scope thereof. Alternatively, the assembly provided by this invention may be used with non-porous reactant flow field plates in place of the preferred combined water transport plate/reactant flow field.

EXAMPLE

Subscale (3"×3") component fuel cell parts were laminated together in one step with THERMOBOND 845 and THERMOBOND 845 EG polyolefin films, manufactured by 3M Corporation. A 4 mil THERMOBOND 845 film was disposed between the water transport plates and respective substrates. A 2 mil 845 EG film was placed between the cathode water transport plate and the anode water transport plate halves. The thermoplastic film was cut into a frame form of 0.25" wide and 2.87"×2.87 outside dimensions. The assembly was placed into a Culver press and heated to 300 degrees Fahrenheit. When the target temperature was reached, a load of 450 psi was applied on the seal area and held for 10 minutes. The assembly was then cooled to 100 degrees Fahrenheit and the load removed. The lamination procedure fills the substrate layers to form a gas-tight edge seal while simultaneously bonding the components together.

This construction was tested to determine the integrity of the seals. The assembly was vacuum filled with water and pressure tested. No leaks were observed when tested up to 25 psig. Lap shear specimens were also prepared by bonding two 1"×6"×0.090" tin oxide treated water transport plate panels to each other with the 845 EG thermoplastic film and pulling in tension with an Instron machine. Results showed that the bond was stronger than the water transport plate material.

In view of the foregoing, the improved PEM fuel cell 10 of the present invention provides improved component edge sealing and bonding by employment of layers of thermoplastic films therebetween. The employment of such thermoplastic films make the sealing of the component parts of the fuel cell 10 more effective and reliable while permitting less leakage than prior art fuel cell assemblies. In addition, the use of thermoplastic films for bonding and sealing results in the use of more inert materials which reduces the likelihood of introducing contaminants to the proton exchange membrane. Since the thermoplastic material, such as hot melt glue, does not cure, it can be re-melted as necessary to achieve the thin film needed for a low voltage drop in a PEM fuel cell assembly. The thermoplastic material has further advantages in that it is readily commercially available in preform film configurations which can be cut into the desired gasket form for ease of installation. Various combinations of seals with different types of thermoplastic materials for different components of the fuel cell may be used depending on the application. For example, thermoplastic material may be employed on certain components while elastomer or other materials be used on other components. In general, a thermoplastic material layer may be employed as needed throughout a fuel cell to take advantage of the desirable characteristics of using such a thermoplastic material layer.

It would be appreciated by those skilled in the art that various changes and modifications can be made to the illustrated embodiments without departing from the spirit of the present invention. All such modifications and changes are intended to be covered by the appended claims.

What is claimed is:

1. A PEM fuel cell assembly, comprising:
   a proton exchange membrane having a first side and a second side;
   a cathode catalyst layer disposed on said first side of said proton exchange membrane;
   an anode catalyst layer disposed on said second side of said proton exchange membrane;
   an anode porous substrate disposed on a side of said anode catalyst layers not in contact with said proton exchange membrane;
   an anode water transport plate disposed on a side of said anode porous substrate not in contact with said anode catalyst layer; said anode water transport plate having a central area and a peripheral area;
   a cathode water transport plate disposed on a side of said anode water transport plate not in contact with said anode substrate; said cathode water transport plate having a central area and a peripheral area;
   a bonding and sealing layer of thermoplastic material disposed between said anode water transport plate and said cathode water transport plate at respective peripheral areas thereof; said layer of thermoplastic material bonding and sealing said anode water transport plate and said cathode water transport plate relative to one another;
   a cathode substrate disposed on a side of said cathode water transport plate not in contact with said anode water transport plate; and
   a cathode catalyst layer disposed on a side of said cathode substrate not in contact with said cathode water transport plate.

2. The PEM fuel cell assembly of claim 1, wherein said anode porous substrate is impregnated at its periphery with a thermoplastic polymer; and said cathode porous substrate is impregnated at its periphery with a thermoplastic polymer.

3. The proton exchange membrane fuel cell assembly of claim 1, wherein said thermoplastic material is a polyolefin film.

4. The proton exchange membrane fuel cell assembly of claim 1, wherein said thermoplastic material is a polyvinyl fluoride film.

5. The proton exchange membrane fuel cell assembly of claim 1, wherein said thermoplastic material is a polyvinylidine fluoride film.

6. The proton exchange membrane fuel cell assembly of claim 1, further comprising:

a bonding and sealing layer of foam tape disposed between said anode substrate and said anode water transport plate at respective peripheral areas thereof; said layer of foam tape bonding and sealing said anode substrate and said anode water transport plate relative to one another.

7. The proton exchange membrane fuel cell assembly of claim 1, further comprising:

a bonding and sealing layer of thermoplastic material disposed between said anode substrate and said anode substrate and said proton exchange membrane at respective peripheral areas thereof; said layer of thermoplastic material bonding and sealing said anode substrate and said proton exchange membrane relative to one another.

8. The proton exchange membrane fuel cell assembly of claim 1, further comprising:

a bonding and sealing layer of foam tape disposed between said cathode water transport plate and said cathode substrate at respective peripheral areas thereof; said layer of foam tape bonding and sealing said cathode water transport plate and said cathode substrate relative to one another.

9. The proton exchange membrane fuel cell assembly of claim 1, further comprising:

a bonding and sealing layer of neoprene tape disposed between said anode substrate and said anode water transport plate at respective peripheral areas thereof; said layer of neoprene tape bonding and sealing said anode substrate and said anode water transport plate relative to one another.

10. The proton exchange membrane fuel cell assembly of claim 1, further comprising:

a bonding and sealing layer of neoprene tape disposed between said cathode water transport plate and said cathode substrate at respective peripheral areas thereof; said layer of neoprene tape bonding and sealing said cathode water transport plate and said cathode substrate relative to one another.

11. The proton exchange membrane fuel cell assembly of claim 1, wherein said proton exchange membrane, said catalyst layers, said gas diffusion layers and said porous substrates are bonded together to form a membrane electrode assembly.

12. A proton exchange membrane fuel cell assembly, comprising:

an anode water transport plate having an anode central region and an anode peripheral region;

a cathode water transport plate having a cathode central region and a cathode peripheral region; said cathode water transport plate being positioned in contact with said anode water transport plate with said anode central region being aligned with said cathode central region and said anode peripheral region being aligned with said cathode peripheral region;

a layer of thermoplastic material residing between said anode water transport plate and said cathode water transport plate at said anode peripheral region and said cathode peripheral region; said layer of thermoplastic material bonding and sealing said anode water transport plate relative to said cathode water transport plate.

13. A proton exchange membrane fuel cell assembly, comprising:

a substrate having a peripheral edge seal of extruded thermoplastic material;

a water transport plate having a central region and a peripheral region;

a layer of foam tape residing between said peripheral edge seal of said substrate and said water transport plate at said peripheral region; said layer of foam tape bonding and sealing said substrate relative to said water transport plate.

14. A proton exchange membrane fuel cell assembly, comprising:

a substrate having a central region and a peripheral region;

a membrane electrode assembly having a central region and a peripheral region; said membrane electrode assembly containing said substrate; and a layer of thermoplastic material disposed between said peripheral region of said substrate and said peripheral region of said membrane electrode assembly; said layer of thermoplastic material bonding and sealing said substrate and said gas diffusion layer relative to said membrane electrode assembly.

15. The proton exchange membrane fuel cell assembly of claim 14, wherein said peripheral region of said substrate is embedded with a thermoplastic polymer.

16. The proton exchange membrane fuel cell assembly of claim 14, wherein said thermoplastic material is polyolefin.

17. The proton exchange membrane fuel cell assembly of claim 14, wherein said thermoplastic material is polyvinyl fluoride.

18. The proton exchange membrane fuel cell assembly of claim 14 wherein said thermoplastic material is polyvinylidine fluoride.

* * * * *

UNITED STATES PATENT AND TRADEMARK OFFICE
CERTIFICATE OF CORRECTION

PATENT NO.   : 6,159,628
DATED        : December 12, 2000
INVENTOR(S)  : Albert P. Grasso, Myron Krasij, and Michael J. Rajpolt It is certified that error appears in the above-identified patent and that said Letters Patent is hereby corrected as shown below:

Title page, item [63],
Related U.S. Application Data, "Continuation of applicatin No. 09/176,355, Oct. 21, 1998, and a continuation of application No. 09/182,959, Oct. 30, 1998, Pat. No. 6,020,083" should be deleted.

Column 1,
Line 5, "continuation" should be -- related application --.

Signed and Sealed this

Eighteenth Day of September, 2001

Attest:

*Nicholas P. Godici*

NICHOLAS P. GODICI
*Attesting Officer*    *Acting Director of the United States Patent and Trademark Office*